Nov. 25, 1958 J. J. DALE 2,861,547
ADJUSTABLE LEASH
Filed Aug. 28, 1957
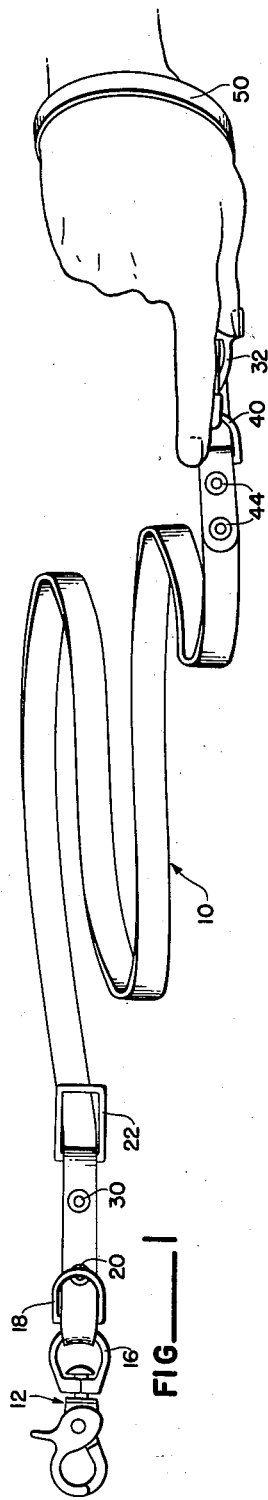
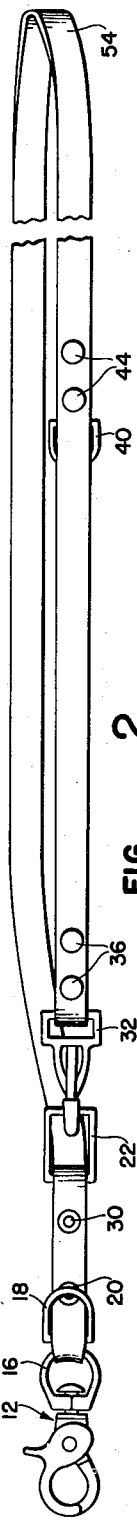
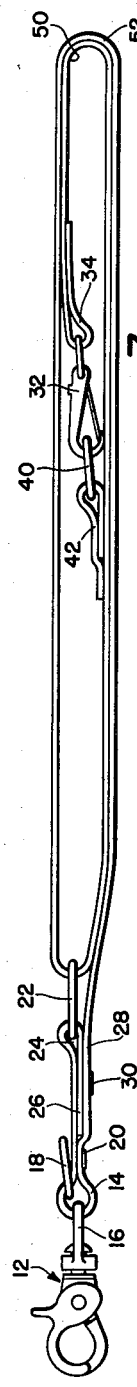
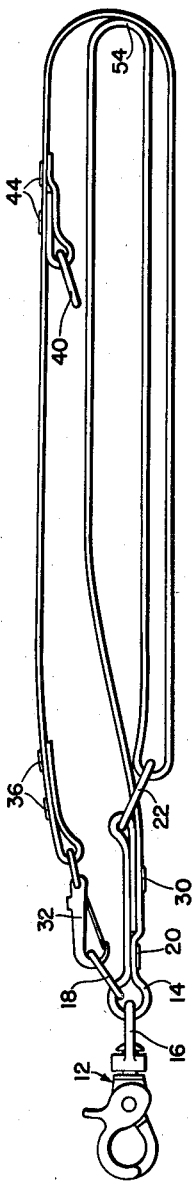
JOSEPH J. DALE
INVENTOR.
BY Smith & Tuck

2,861,547
ADJUSTABLE LEASH
Joseph J. Dale, Seattle, Wash.

Application August 28, 1957, Serial No. 680,784

2 Claims. (Cl. 119—109)

This present invention relates to the general class of animal leashes and more particularly to a leash which is arranged so that it may be readily adjusted as to length without unsnapping the same from the animal's collar or harness and which in its various adjusted positions will preserve the full strength of the leash.

The training of animals and particularly the training of dogs commands the studied attention of large numbers of people in various walks of life. Dogs are trained, of course, for many purposes, hunting dogs, dogs trained for show purposes and especially the training for guard and protection purposes. The routine of training is quite similar actually in these various categories, in that a dog is trained to follow on a slack leash, he is taught to stand when he is tied with a leash, and it has been found by successful trainers that during the course of the training it is very desirable to have a very short leash, a medium, a long length or a slack leash. Naturally as the leash becomes shorter the trainer has more direct contact with the animal and is able to control him much quicker and with greater certainty.

As various forms of training are normally interspersed in order that the animal will be adequately trained over the full range it is proven desirable to have a leash that is readily adjustable to various lengths quickly and without at any time unsnapping the leash from the collar of the animal. In the past many forms of leashes have been provided in an endeavor to solve this problem. However, in this present leash it is possible to have conveniently arranged four different lengths of leash with all the folds of a strap-like leash lying in a flat compact arrangement without any twists in the strap or unsightly loops. It is, therefore, believed that in this present leash I have provided a means that will greatly assist in the training of animals.

A principal object of this present invention is to provide a leash which does not need to be unsnapped from the animal while it is being formed into any one of the several different lengths of leash arrangements.

A further object of this invention is to provide an adjustable leash arrangement in which all the plies of leather in the shortened forms of the leash will all lie in flat contact with each other so that a neat leash results and one that will not offer any twists or the like which might injure or even cut the hand of the trainer if a dog should become excited or momentarily unruly.

A further object of this invention is to provide means where full loops of the leash can be passed through rings adjacent the swivel snap without in any way lessening the trainer's hold on the leash and in turn the leash's secure attachment to the collar or harness of the dog.

Further objects, advantages and capabilities will be apparent from the description and disclosure in the drawings, or may be comprehended or are inherent in the device.

In the drawings:

Figure 1 is a perspective view illustrating one manner of using this leash where it is in its fully extended position except for a relatively short loop that is commonly used to encircle the hand above the wrist in order that the trainer may have a very secure hold on the end of the leash.

Figure 2 illustrates one of two alternate forms of doubling the leash once to substantially reduce the length to one-half. Two separate but closely spaced loops are provided for the engagement of the leash end snap.

Figure 3 illustrates a form of the leash in which the length is reduced to approximately one-third of the full length of the leash.

Figure 4 illustrates the maximum shortening of the leash in which the leash is reduced to approximately one quarter of its full length.

Referring more particularly to the disclosure in the drawings, the numeral 10 designates the flexible lead member of my leash, this in the preferred form of my leash is preferably made of a leather strap of good quality. At the animal engaging end of the leash, a preferably swivel snap 12 is employed. This snap should be of adequate strength so as to complement strap 10 in providing a strong secure leash. The actual snap portion that engages the ring of the animal's collar or harness may take on various forms, the one illustrated is the so-called sister hook type, one member of which is spring actuated so as to always have a resilient means to prevent the uncoupling of the snap from the animal's collar.

As a preferred construction the leather loop 14 which engages the ring 16 of snap 12 also positions a D-ring 18. This construction is probably most fully illustrated in Figures 3 and 4 of the drawings wherein a rivet or strong stitching is employed at 20. The free portion of the double back end of the flexible lead member is preferably doubled back on itself after passing through a square or rectangular third ring or metal frame member normally referred to by the trade as a square ring 22 thus forming the loop at 24 and with the end of the double back portion 26 hidden in between loop 24 and the main portion of the leash as 28. The preferred fastening at this point is a through rivet 30.

At the opposite end of the flexible lead member 10, some form of preferably non-swiveling type of snap 32 is secured within loop 34. This loop is preferably secured by a plurality of rivets 36 so that it will have strength substantially equal to that of the other end of the lead member which employs two through rivets as 20 and 30.

Disposed on the same side of the lead strap 10 as are D-ring 18 and the square ring 22, is a second D-ring which is secured by a separate looped-back-on-itself leather member 42. This member is preferably provided with a plurality of rivets 44 to in turn carry out the balance of strength for the various parts of this leash. D-ring 40 is positioned sufficiently close to the end which bears the plain snap 32 so that when this second snap is secured in D-ring 40 a hand loop 50 is provided that is of convenient size to insure the most secure grip on the end of the leash after the showing of Figure 1. This loop also provides a very convenient means for tying a dog to a post or ring or any hitching member.

Manner of using the leash

In using this present leash it of course may be employed as a slack leash after the showing of Figure 1. The spring snap 12 would be engaged in the collar or harness of the dog, the swivel snap being desirable at this point, in that as the dog turns around he will not twist the leash, which can so easily occur when a hand loop as 50 is employed after the showing of Figure 1. If the trainer or owner desires closer contact with his dog snap 32 may be secured in either square ring 22 after the showing of Figure 2, or the D-ring 18, whichever is most convenient. This arrangement substantially reduces the length of the leash to one-half.

In Figure 3 an intermediate arrangement is provided in which snap 32 is passed through the rectangular or square ring as it is normally termed in the trade and around the end to form a second end loop and then secured to D-ring 40. An alternate to this procedure would be to take the loop as shown at 50, and pass it, without disconnecting snap 32 from D-ring 40, through the square ring 22 until loop 50 lies snugly inside the end loop 52.

In Figure 4 a form is shown in which the leash is reduced to substantially one quater of its length and this is very conveniently achieved by starting with the position of the leash shown in Figure 2 with snap 32 engaged preferably in the D-ring 18. The trainer then grasps the loop end as at 54, and passes it through the square ring 22, and pulls it down until loop 54 is inside the bight of the lead member after the showing of Figure 4. It is to be stressed that in all these various foreshortenings of the long leash it is not at any time necessary to disconnect snap 12 and at no time does the trainer need to give up an end loop as 50, 52, or 54. He thus has maximum purchase on the leash at all times and this is very desirable, particularly in training excitable dogs.

With this present form leash the trainer is not hampered at any time with excess length or bulk of the leash. Normally it so often happens that in order to gain better control of the animal the trainer will gather a good deal of the leash up in his hand or he may wrap the leash around his hand. This becomes a clumsy arrangement and too often a fold or two of the leash will slip from his grasp which may tend to undue some of the training just received. By having the leash neatly folded and secured upon itself after the showings in the drawings it has been found that there is a minimum of distraction to the animal and of course a much more satisfactory arrangement for the trainer.

It is believed that it will be clearly apparent from the above description and the disclosure in the drawings that the invention comprehends a novel construction of an adjustable leash.

Having thus disclosed the invention, I claim:

1. An adjustable animal leash, comprising: a single flexible lead member having secured at one end, a swivel snap and a first D-ring and at the other end a plain snap; said swivel snap and first D-ring secured in an end loop formed by doubling the lead member back on itself and securing the same; the end doubled back being in turn doubled back and separately secured to the lead member to form a second loop; a square ring secured in said second loop and a second D-ring secured to said lead member near the end having the plain snap and adapted to form a hand loop when said plain snap is engaged in said second D-ring.

2. An adjustable animal leash, comprising: a single flexible strap lead member having secured at one end, a swivel lead ring engaging means and a first D-ring and at the other end a second ring engaging means; said swivel means and first D-ring secured in an end loop formed by doubling the lead strip member back on itself and securing the same; the end doubled back being in turn doubled back and separately secured to the lead strap member to form a second loop; a rectangular open frame member secured in said second loop; a second D-ring secured to said lead member near the end having the second ring engaging means and adapted to form a hand loop when said second ring engaging means is engaged in said second D-ring; said first D-ring, second D-ring and rectangular open frame member all disposed on the same side of said lead strap member.

References Cited in the file of this patent

FOREIGN PATENTS 634,446     Great Britain _____ Mar. 22, 1950